United States Patent
Hibst et al.

(10) Patent No.: US 8,506,847 B2
(45) Date of Patent: Aug. 13, 2013

(54) PROCESS FOR THE PREPARATION OF CRYSTALLINE LITHIUM-, VANADIUM- AND PHOSPHATE-COMPRISING MATERIALS

(75) Inventors: Hartmut Hibst, Schriesheim (DE); Brian Roberts, South Euclid, OH (US); Jordan Keith Lampert, Ludwigshafen (DE); Kirill Bramnik, Jersey City, NJ (US)

(73) Assignee: BASF SE, Ludwigshafen (DE)

( * ) Notice: Subject to any disclaimer, the term of this patent is extended or adjusted under 35 U.S.C. 154(b) by 533 days.

(21) Appl. No.: 12/680,797

(22) PCT Filed: Sep. 18, 2008

(86) PCT No.: PCT/EP2008/062428
§ 371 (c)(1),
(2), (4) Date: May 25, 2010

(87) PCT Pub. No.: WO2009/043730
PCT Pub. Date: Apr. 9, 2009

(65) Prior Publication Data
US 2010/0283012 A1    Nov. 11, 2010

Related U.S. Application Data

(60) Provisional application No. 60/976,635, filed on Oct. 1, 2007, provisional application No. 61/024,366, filed on Jan. 29, 2008.

(51) Int. Cl.
*H01B 1/06* (2006.01)
*H05B 7/085* (2006.01)
*H01M 4/88* (2006.01)

(52) U.S. Cl.
USPC ........ 252/507; 252/182.1; 252/506; 252/508; 252/509; 252/519.12; 252/519.14; 429/218.1; 429/221; 429/231.1; 977/742

(58) Field of Classification Search
USPC ......... 252/182.1, 506, 507, 508, 509, 519.12, 252/519.14; 429/218.1, 221, 231.1; 977/742
See application file for complete search history.

(56) References Cited

U.S. PATENT DOCUMENTS

| 4,567,158 | A | 1/1986 | Wrobleski et al. | |
|---|---|---|---|---|
| 5,871,866 | A | 2/1999 | Barker et al. | |
| 5,910,382 | A | 6/1999 | Goodenough et al. | |
| 6,203,946 | B1 * | 3/2001 | Barker et al. | 429/231.1 |
| 6,528,033 | B1 | 3/2003 | Barker et al. | |
| 2004/0033360 | A1 | 2/2004 | Armand et al. | |

(Continued)

FOREIGN PATENT DOCUMENTS

| EP | 1 391 424 | 2/2004 |
|---|---|---|
| JP | 2005 108681 | 4/2005 |

(Continued)

OTHER PUBLICATIONS

Sebastien Patouxa, Calin Wurm, Mathieu Morcrette, Gwenaelle Rousse, Christian Masquelier, A comparative structural and electrochemical study of monoclinic Li3Fe2(PO4)3 and Li3V2(PO4)3, Journal of Power Sources 119-121 (2003) 278-284, 2003 Elsevier Science B.V. All rights reserved.*

(Continued)

*Primary Examiner* — Bijan Ahvazi
(74) *Attorney, Agent, or Firm* — Oblon, Spivak, McClelland, Maier & Neustadt, L.L.P.

(57) ABSTRACT

The present invention relates to a process for the preparation of compounds of general formula (I) $Li_{a-b}M^1{}_bV_{2-c}M^2{}_c(PO_4)_x$ (I) with $M^1$: Na, K, Rb and/or Cs, $M^2$: Ti, Zr, Nb, Cr, Mn, Fe, Co, Ni, Al, Mg and/or Sc, a: 1.5-4.5, b: 0-0.6, c: 0-1.98 and x: number to equalize the charge of Li and V and $M^1$ and/or $M^2$, if present, wherein a–b is >0, by providing an essentially aqueous mixture comprising at least one lithium-comprising compound, at least one vanadium-comprising compound in which vanadium has the oxidation state +5 and/or +4, and at least one $M^1$-comprising compound, if present, and/or at least one $M^2$-comprising compound, if present, and at least one reducing agent which is oxidized to at least one compound comprising at least one phosphorous atom in oxidation state +5, drying and calcining.

8 Claims, 4 Drawing Sheets

(56) References Cited

U.S. PATENT DOCUMENTS

| | | |
|---|---|---|
| 2004/0086445 A1 | 5/2004 | Armand et al. |
| 2007/0134554 A1 | 6/2007 | Armand et al. |
| 2010/0044651 A1 | 2/2010 | Bramnik et al. |
| 2011/0037032 A1 | 2/2011 | Hibst et al. |
| 2012/0012797 A1 | 1/2012 | Bramnik et al. |

FOREIGN PATENT DOCUMENTS

| | | |
|---|---|---|
| WO | 02 27824 | 4/2002 |
| WO | 2004 082047 | 9/2004 |

OTHER PUBLICATIONS

Patoux, S. et al., "A Comparative Structural and Electrochemical Study of Monoclinic $Li_3Fe_2(PO_4)_3$ and $Li_3V_2(PO_4)_3$". Journal of Powder Sources, vol. 119-121. pp. 278-284, (Jun. 1, 2003) XP002540144.

Wurm, C. et al., "Lithium Insertion/Extraction Into/From $LiMX_2O_7$ Compositions (M=Fe, V; X=P, As) Prepared Via a Solution Method", Chemistry of Materials, vol. 14, pp. 2701-2710, (May 18, 2002) XP002540145.

U.S. Appl. No. 12/988,418, filed Oct. 18, 2010, Hibst, et al.

U.S. Appl. No. 13/379,048, filed Dec. 19, 2011, Schroedle, et al.

Taiwanese Search Report issued Apr. 18, 2012, in Taiwanese Patent Application No. 097136968.

Taiwanese Search Report issued Apr. 19, 2012, in Taiwanese Patent Application No. 097136971.

* cited by examiner

PROCESS FOR THE PREPARATION OF CRYSTALLINE LITHIUM-, VANADIUM-AND PHOSPHATE-COMPRISING MATERIALS

The present invention relates to a process for the preparation of compounds comprising lithium, vanadium and phosphate-anions, to a process for the preparation of mixtures comprising these compounds and at least one electrically conducting material, to the compounds and the mixtures, preparable by these processes and the use of these compounds and mixtures for the preparation of cathodes of lithium ion batteries.

Processes for the preparation of $Li_3V_2(PO_4)_3$ are already known from the prior art.

U.S. Pat. No. 6,528,033 B1 discloses a method for making compounds like $Li_3V_2(PO_4)_3$ in a so called carbo-thermal procedure. A mixture of $V_2O_5$, $Li_2CO_3$ $(NH_4)_2HPO_4$ and carbon is heated to 300° C. to remove ammonia, water and carbon dioxide, the cooled mixture is powderized and pelletized, and heated in an inert atmosphere to a temperature of 850° C. In the carbo-thermal procedure according to this document carbon is the agent which is reducing $V^{5+}$ to $V^{3+}$.

U.S. Pat. No. 5,871,866 discloses a procedure for the preparation of $Li_3V_2(PO_4)_3$ by mixing $Li_2CO_3$, $V_2O_5$ and $(NH_4)_2HPO_4$ in methanol and drying this slurry subsequently. The powder obtained therefrom is calcinated at a temperature of 875° C. in pure hydrogen as the reducing agent.

U.S. Pat. No. 5,910,382 discloses a process for the preparation of $Li_3V_2(PO_4)_3$ starting from $Na_3V_2(PO_4)_3$ by exchanging the sodium-ions with lithium-ions.

C. Wurm et al., Chem. Mater. 2002, 14, pages 2701 to 2710, disclose $LiM_xP_2O_7$, in which M is Fe or V which are prepared by mixing soluble precursors in water, followed by slow evaporation of water and annealing at temperatures of 300 to 800° C. in an atmosphere of nitrogen and hydrogen.

S. Patoux et al., J. Power Sources 119 to 121 (2003), pages 278 to 284, disclose pure monoclinic $Li_3M_2(PO_4)_3$, wherein M is Fe or V, by initial homogenization of precursors in aqueous solution followed by slow evaporation of $H_2O$ and volatile species and further annealing of the resulting solid under crystallisation. Annealing is conducted under an atmosphere of nitrogen and hydrogen.

The processes for the preparation of $Li_3V_2(PO_4)_3$ according to the prior art bear the drawback that an additional reducing agent has to be added to the reaction mixture or that the calcination step has to be conducted in a reducing atmosphere. Other disadvantages are that if solid compounds like $Li_2CO_3$ and $V_2O_5$ are mixed in solid phase, it is difficult to obtain a mixture having a homogenous dispersion of the different ions throughout the whole mixture.

The object of the present invention is to provide a process for the preparation of lithium-vanadium-phosphates which makes it possible to obtain these compounds in a very homogenously mixed and crystalline state. In addition, it is an object of the present invention to provide a process for the preparation of the mentioned compounds which can be conducted easily and with only a few reaction steps. Moreover, it is object of the present invention to provide a process for the preparation of lithium-vanadium-phosphates, in which the usually applied calcination temperature can be increased to 800° C. and more to prepare a single-phase lithium-vanadium-phosphate. It is a further object to obtain a more fine dispersed material with a very narrow size distribution of the crystallites, supplying improved Li-ion diffusivity in the charging and discharging of a Li-ion battery, in order to improve the Li-ion diffusivity, the power characteristics and additionally to increase the capacity of a Li-ion battery.

These objects are achieved by a process for the preparation of compounds of general formula (I)

$$Li_{a-b}M^1_bV_{2-c}M^2_c(PO_4)_x \quad (I)$$

wherein $M^1$, $M^2$, a, b, c and x have the following meanings:
$M^1$: Na, K, Rb and/or Cs,
$M^2$: Ti, Zr, Nb, Cr, Mn, Fe, Co, Ni, Al, Mg and/or Sc,
a: 1.5-4.5,
b: 0-0.6,
c: 0-1.98 and
x: number to equalize the charge of Li, and V and $M^1$ and/or $M^2$, if present,
wherein a−b>0,
comprising the following steps
(A) providing an essentially aqueous mixture comprising at least one lithium-comprising compound, at least one vanadium-comprising compound, in which vanadium has the oxidation state +5 and/or +4, and at least one $M^1$-comprising compound, if present, and/or at least one $M^2$-comprising compound, if present, and at least one reducing agent which is oxidized to at least one compound comprising at least one phosphorous atom in oxidation state +5,
(B) drying the mixture provided in step (A), in order to obtain a solid compound and
(C) calcining the solid compound obtained from step (B) at a temperature of 300 to 950° C.

In a preferred embodiment, $M^1$, $M^2$, a, b and c have the following meanings:
$M^1$: Na,
$M^2$: Fe, Co, Ni and/or Al,
a: 2.0-4.0, particularly preferred 2.5-3.5, specifically preferred 2.75-3.25, for example 2.9-3.1,
b: 0-0.6, particularly preferred 0-0.4, specifically preferred 0-0.2, for example 0.05, if present 0.01-0.6, particularly preferred 0.01-0.4, specifically preferred 0.01-0.2, for example 0.01-0.05, wherein a−b>0,
c: 0-1.8, particularly preferred 0-1.0, for example 0-0.5, if present 0.1-1.8, particularly preferred 0.1-1.0, for example 0.1-0.5.
x is chosen in order to equalize the charge of the compound of general formula (I), depending on the presence, oxidation state and the amount of Li and V, and optionally being present $M^1$ and/or $M^2$. x has always a value that, depending on Li and V and $M^1$ and $M^2$, if present, a neutrally charged compound of general formula (I) is obtained. x can have values of 1.5 to 4.5.

For example, in a very preferred embodiment, $M^1$ and $M^2$ are absent, and c is 0, which makes x to be 3, in order to have a neutrally charged compound of general formula (I) $Li_3V_2(PO_4)_3$.

In a very preferred embodiment, the process according to the present invention is conducted in order to obtain the compound of formula $Li_3V_2(PO_4)_3$.

In further preferred embodiments, $M^1$, being for example Na or K, is present in an amount of up to 10 mol %, in respect of the sum of Li and $M^1$. In another preferred embodiment, $M^2$, being for example Fe, Co, Ni, Al, is present in an amount of up to 50 mol %, in respect of the sum of vanadium(III) and $M^2$ present in the compound.

Therefore, preferred embodiments of the present invention are embodiments, in which Li, is substituted by $M^1$ in an amount of up to 10 mol % in respect of the sum of the amounts of Li and $M^1$, and vanadium(III) is substituted with $M^2$ in an amount of up to 50 mol %, in respect of the sum of the amounts of vanadium(III) and $M^2$.

Process steps (A), (B) and (C) are explained in the following in more detail:

Step (A):

Step (A) of the process according to the present invention comprises providing an essentially aqueous mixture comprising at least one lithium-comprising compound, at least one vanadium-comprising compound, in which vanadium has the oxidation state +5 and/or +4, and at least one $M^1$-comprising compound, if present, and/or at least one $M^2$-comprising compound, if present, and at least one reducing agent which is oxidized to at least one compound comprising at least one phosphorous atom in oxidation state +5.

In general, all Li—, $M^1$- and $M^2$-comprising compounds known to a person having ordinary skill in the art which are able to be incorporated in an essentially aqueous mixture in step (A) of the process can be used in the process according to the present invention.

The Li-comprising compound in step (A) is chosen preferably from the group consisting of lithium hydroxide LiOH, lithium hydroxide-hydrate $LiOH*H_2O$, lithium acetate LiOAc, lithium carbonate $Li_2CO_3$, and mixtures thereof. In a very preferred embodiment, lithium hydroxide LiOH and/or lithium hydroxide-hydrate $LiOH*H_2O$ and/or lithium carbonate $Li_2CO_3$ are used as lithium-comprising compounds in step (A) of the process according to the present invention. Two particularly preferred lithium-comprising compounds are lithium hydroxide LiOH and lithium hydroxide-hydrate $LiOH*H_2O$.

The at least one lithium-comprising compound is added to the mixture in step (A) in the process according to the present invention in a concentration of in general 0.04 to 3 mol Li/l, preferably 0.2 to 2.0 mol Li/l, particularly preferred 0.3 to 1.5 mol Li/l, based on the whole reaction mixture in each case.

In general, all vanadium-comprising compounds in which vanadium has the oxidation state +5 and/or +4, known to a person having ordinary skill in the art can be used in the process according to the present invention which are able to be incorporated in an essentially aqueous mixture in step (A) of the process. According to the present invention, a single vanadium-comprising compound in which vanadium has the oxidation state +5, or a mixture of different vanadium-comprising in which vanadium has the oxidation state +5 can be used. In addition, a single vanadium-comprising compound in which vanadium has the oxidation state +4, or a mixture of different vanadium-comprising compounds in which vanadium has the oxidation state +4 can be used. It is also possible that a mixture of different vanadium-comprising compounds can be used in which vanadium has the oxidation states +5 and +4.

In a preferred embodiment, the vanadium-comprising compound in which vanadium has the oxidation state +5 is chosen from the group consisting of vanadium(V)-oxide $V_2O_5$, ammonium-metavanadate(V) $NH_4VO_3$, ammonium-polyvanadate and mixtures thereof. Ammonium-polyvanadate is a vanadium(V)-oxide, comprising ammonium-cations in an amount of about 5% by weight. Preferred vanadium-comprising compounds in which vanadium has the oxidation state +4 are chosen from the group consisting of vanadyl(IV) sulfate hydrate $VOSO_4.xH_2O$, vanadium(IV)oxide $VO_2$ and mixture thereof. x in $VOSO_4.xH_2O$ can have different meanings depending on the drying state of the compound, for example x is 0, if the compound has been dried completely. In a preferred embodiment of the present application, at least one vanadium comprising compound is used in which vanadium has the oxidation state +5.

The at least one vanadium-comprising compound is added to the mixture in step (A) in the process according to the present invention in a concentration of in general 0.04 to 2.0 mol V/l, preferably 0.1 to 1.3 mol V/l, particularly preferred 0.2 to 1.0 mol V/l, based on the whole reaction mixture in each case.

The at least one $M^1$-comprising compound, if present, is preferably chosen from the group consisting of sodium hydroxide NaOH, sodium hydroxide-hydrate $NaOH*H_2O$, sodium acetate NaOAc, sodium carbonate $Na_2CO_3$, and mixtures thereof. In a very preferred embodiment, sodium hydroxide NaOH and/or sodium hydroxide-hydrate $NaOH*H_2O$ and/or sodium carbonate $Na_2CO_3$ are used as sodium-comprising compounds in step (A) of the process according to the present invention. Two particularly preferred sodium-comprising compounds are sodium hydroxide NaOH and sodium hydroxide-hydrate $NaOH*H_2O$.

The at least one $M^2$-comprising compound, if present, is preferably chosen from compounds having the required cation and an anion chosen from hydroxide, acetate, oxide, carbonate, halide, like fluoride, chloride, bromide, iodide, and mixtures thereof. In a very preferred embodiment, the anion of the at least one $M^2$-comprising compound is acetate, oxide, hydroxide, carbonate or mixtures thereof.

$M^1$- and/or $M^2$-comprising compounds are added to the essentially aqueous mixture, if present, in amounts, in which they are present in compounds of formula (I). A person having ordinary skill in the art knows how to calculate the required amount.

The process according to the present invention is preferably conducted by introducing at least one reducing agent into the mixture in step (A) of the process according to the present invention, which is oxidized to at least one compound comprising at least one phosphorous atom in an oxidation state +5 during the process according to the present invention. The use of at least one reducing agent, which is oxidized to at least one compound comprising at least one phosphorous atom in oxidation state +5 has the advantage that the oxidation product of this reducing agent gives rise to $PO_4^{3-}$-anions, which are needed in order to obtain the $PO_4^{3-}$-comprising compound of general formula (I).

In a preferred embodiment, the at least one reducing agent that is oxidized to at least one compound comprising at least one phosphorous atom in oxidation state +5, is carbon free. According to the present invention, carbon free means that no carbon atoms are present in the reducing agent. An advantage of a carbon free reducing agent, like $H_3PO_3$, is that the reduction can be conducted at low temperatures like 300 or 350° C., whereas carbon as reducing agent makes temperatures necessary of 600° C. and higher. These low temperatures make it possible to obtain nano crystalline materials. Nano crystalline materials can not be obtained advantageously at high temperatures which are necessary if carbon is used as the reducing agent.

In a preferred embodiment, the at least one reducing agent which is oxidized to at least one compound comprising at least one phosphorous atom in a oxidation state +5 is chosen from the group consisting of $H_3PO_3$, $(NH_4)H_2PO_3$, $(NH_4)_2HPO_3$, $(NH_4)_3PO_3$, $H_3PO_2$, $(NH_4)H_2PO_2$, $(NH_4)_2HPO_2$, $(NH_4)_3PO_2$ and mixtures thereof. In a particularly preferred embodiment $H_3PO_3$, $(NH_4)H_2PO_3$, $(NH_4)_2HPO_3$, $(NH_4)_3PO_3$ are used, a very preferred reducing agent is $H_3PO_3$.

The at least one reducing agent which is oxidized to at least one compound comprising at least one phosphorous atom in oxidation state +5 is added to the mixture in step (A) in the process according to the present invention in a concentration of in general 0.04 to 2.0 mol P/l, preferably 0.1 to 1.3 mol P/l, particularly preferred 0.2 to 1.0 mol P/l, based on the whole reaction mixture in each case.

According to the present invention at least one reducing agent which is oxidized to at least one compound comprising at least one phosphorous atom in oxidation state +5 is added to the reaction mixture in step (A) of the process according to the present invention. The reducing agent that is used in the process according to the present invention will preferably be oxidized to $PO_4^{3-}$. Because the at least one reducing agent which is oxidized to at least one compound comprising at least one phosphorous atom in oxidation state +5 is added to the reaction mixture in a preferably at least equimolar amount, particularly preferred in an equimolar amount, $PO_4^{3-}$ is obtained as the oxidizing product in an amount high enough to be the complete amount of anion of the compound of general formula (I). According to this embodiment no compound having at least one phosphorous atom in oxidation state +5 has to be added.

In another preferred embodiment of the present application the essentially aqueous solution which is provided in step (A) additionally comprises at least one compound comprising at least one phosphorous atom in oxidation state +5. In this preferred embodiment of the present invention a combination of at least one reducing agent which is oxidized to at least one compound comprising at least one phosphorous atom in oxidation state +5 and at least one compound comprising at least one phosphorous atom in oxidation state +5 is added to the reaction mixture in step (A) of the process according to the present invention. The reducing agent that is used in the process according to the present invention will preferably be oxidized to $PO_4^{3-}$. In this embodiment of the process according to the present application, $PO_4^{3-}$ that is obtained as the oxidizing product is not present in an amount high enough to be the complete amount of anion of the compound of general formula (I). Therefore, in this embodiment, at least one compound having at least one phosphorous atom in oxidation stage +5 has to be added.

This at least one compound comprising at least one phosphorous atom in oxidation state +5 will be the second source of $PO_4^{3-}$-anions, which have to be incorporated into the compound of general formula (I).

Preferred compounds comprising at least one phosphorous atom in oxidation state +5 which are optionally added in step (A) are chosen from the group consisting of $H_3PO_4$, $(NH_4)H_2PO_4$, $(NH_4)_2HPO_4$, $(NH_4)_3PO_4$ and mixtures thereof. Particularly preferred are $H_3PO_4$, $(NH_4)H_2PO_4$, $(NH_4)_2HPO_4$ and mixtures thereof, very preferred is $H_3PO_4$.

The at least one compound comprising at least one phosphorous atom in oxidation state +5 is added to the mixture in step (A) in the process according to the present invention in a concentration of in general 0.02 to 1.0 mol P/l, preferably 0.05 to 0.65 mol P/l, particularly preferred 0.1 to 0.5 mol P/l, based on the whole reaction mixture in each case.

In a further preferred embodiment, in addition to the at least one reducing agent which is oxidized to at least one compound comprising at least one phosphorous atom in oxidation state +5 and optionally at least one compound comprising at least one phosphorous atom in oxidation state +5, at least one additional reducing agent is added to the mixture in step (A) of the process according to the present invention. The additional reducing agent may also be carbon-free or may contain carbon. The at last one additional reducing agent is preferably chosen from hydrazine or derivatives thereof, hydroxyl amine or derivatives thereof, reducing sugars, like glucose and/or saccharose, alcohols like aliphatic alcohols having 1 to 10 carbon atoms, like methanol, ethanol, propanols, for example n-propanol or iso-propanol, butanols, for example n-butanol, iso-butanol, ascorbic acid, and compounds comprising easily oxidisable double bonds, and mixtures thereof.

Examples of derivatives of hydrazine are hydrazine-hydrate, hydrazine-sulfate, hydrazine-dihydrochloride and others. An example of a derivative of hydroxylamine is hydroxylamine-hydrochloride. Particularly preferred carbon-free reducing agents which are not oxidized to at least one compound comprising at least one phosphorous atom in oxidation state +5 are hydrazine, hydrazine-hydrate, hydroxylamine or mixtures thereof.

The at least one reducing agent which is optionally added is by nature not able to deliver $PO_4^{3-}$-anions as oxidation products which can be incorporated into the compound of general formula (I). Therefore, if at least one of these additional reducing agents is used, it is also necessary to use these reducing agents in combination with at least one compound which is oxidized to a compound comprising at least one phosphorous atom in oxidation state and optionally at least one compound comprising at least one phosphorous atom in oxidation state +5. In these cases the amount and the concentrations of the at least one compound which is oxidized to at least one compound comprising at least one phosphorous atom in oxidation state +5, optionally at least one compound comprising at least one phosphorous atom in oxidation state +5 and optionally at least one additionally reducing agent, which are added in step (A) have to be adjusted accordingly. A person having ordinary skill in the art does know how the respective amounts have to be calculated.

The at least one additional reducing agent is optionally added to the mixture in step (A) in the process according to the present invention in a concentration which depends strongly on the reducing power and reducing potential of this agent. A person having ordinary skill in the art does know how the respective amount has to be calculated.

If a combination of at least one reducing agent which is oxidized to a compound comprising at least one phosphorous compound in oxidation stage +5, preferably $H_3PO_3$, and at least one compound comprising at least one phosphorous atom in oxidation stage +5, preferably $H_3PO_4$, is added in step (A) of the process according to the present invention, this combination is preferably added in a ratio, for example, $H_3PO_3/H_3PO_4$, which is larger than the ratio that is necessary to obtain the desired compound according to general formula (I). A person having ordinary skill in the art does know how to calculate the stoichiometric amounts of the components in the mixture of step (A) according to the present invention.

In a preferred embodiment, the at least one lithium-comprising compound, the at least one vanadium-comprising compound, in which vanadium has the oxidation state +5 and/or +4, at least one reducing agent which is oxidized to at least one compound comprising at least one phosphorous atom in oxidation state +5, and optionally at least one compound comprising at least one phosphorous atom in oxidation state +5, are added to the essentially aqueous mixture in amounts that are adjusted in a way that the stoichiometry according to general formula (I) is obtained. A person having ordinary skill in the art does know how to calculate the necessary amounts. In another preferred embodiment of the present invention, the at least one lithium-comprising compound is added in an amount that is ≧1% by weight, preferably ≧2% higher than the stoichiometric amount according to general formula (I).

The mixture which is provided in step (A) of the process according to the present invention is essentially aqueous. The wording "essentially" in this application has the meaning that more than 80% by weight, preferably more than 90% by weight, particularly preferably more than 95% by weight of the solvent, which is used to provide the essentially aqueous mixture in step (A) of the process according to the present invention, is water.

In addition to water, further solvents that are miscible with water can be present. Examples of these solvents are aliphatic alcohols having 1 to 10 carbon atoms like methanol, ethanol, propanols, for example n-propanol or iso-propanol, butanols, for example n-butanol, iso-butanol. According to the present invention, alcohols can be added as additional reducing agent and/or as additional solvent.

In a very preferred embodiment, the solvent that is used in step (A) of the process according to the present invention is water without any additional solvents.

The order, in which the different components are added to the solvent or mixture of solvents in step (A), is not determined. In a preferred embodiment, the lithium-comprising compound is added first to the solvent, the vanadium-comprising compound, in which vanadium has oxidation state +5 and/or +4, is added as the second component. The at least one reducing agent and optionally the at least one compound having at least one phosphorous atom having the oxidation state +5, and optionally the at least one additional reducing agent, are added subsequently.

In a preferred embodiment of the present invention, the mixture obtained from step (A) of the process according to the present invention is an essentially aqueous solution of at least one lithium-comprising compound, at least one vanadium-comprising compound, in which vanadium has the oxidation state +5 and/or +4, at least one reducing agent which is oxidized to at least one compound comprising at least one phosphorous atom in oxidation state +5, optionally in combination with at least one compound comprising at least one phosphorous atom in oxidation state +5.

Step (A) can be conducted in all suitable reactors that are known to a person skilled in the art. Step (A) can be conducted continuously or discontinuously.

The temperature, under which step (A) of the process according to the present invention is conducted is 10 to 120° C., preferably 60 to 100° C., particularly preferably 70 to 95° C. If temperatures higher than 100° C. are used, the reaction mixture has to be present in a pressure-resistant reactor, because of the boiling point of water.

In a preferred embodiment the mixture is stirred in step (A) for a time of 0.1 to 24 hours, particularly preferred 0.5 to 18 hours. The pH-Value of the mixtures to the end of stirring is in general below pH 10, for example at 2.0 to 8.0.

Step (A) of the process according to the present invention can be conducted under an inert atmosphere. Examples of inert gases are nitrogen, noble gases like helium or argon. In a preferred embodiment, step (A) is conducted under a nitrogen atmosphere.

Reduction of most of the $V^{5+}$ to $V^{4+}$ and/or $V^{3+}$ and/or of $V^{4+}$ to $V^{3+}$ is in general conducted in step (A) and/or step (B) of the process according to the present invention. It is further possible that completion of reduction to $V^{3+}$ occurs in step (C) of the process according to the present invention. It is possible that reduction immediately starts after addition of the reducing agent. It is further possible that reduction starts after the reaction mixture is heated to an increased temperature of 40 to 100° C., preferably 60 to 95° C. In another preferred embodiment, if a combination of two P-comprising compounds is used as the reducing agent, for example $H_3PO_3/H_3PO_4$, the reduction starts, when both components are added. In a preferred embodiment at least 50%, particularly preferred at least 75% of the $V^{5+}$ and/or $V^{4+}$ present in the reaction mixture is reduced to $V^{4+}$ and/or $V^{3+}$ in steps (A) and/or (B) of the process according to the present invention.

Step (B):

Step (B) of the process according to the present invention comprises drying the mixture provided in step (A), in order to obtain a solid compound.

In step (B), the mixture obtained from step (A) is converted into a solid compound. The drying of the mixture provided in step (A) of the process according to the present invention can be conducted with all methods known to a person having ordinary skill in the art and which are suitable for the removal of water of an aqueous mixture of the components as mentioned above.

Preferred methods for drying the mixture from step (A) in step (B) are spray-drying, freeze-drying or combinations thereof. According to the present invention, the drying in step (B) can be conducted only by spray-drying, only by freeze-drying or by a combination of the spray-drying and freeze-drying, in both orders.

Spray-drying is preferably conducted by passing the mixture obtained from step (A) through one or more narrow nozzles, wherein fine drops are being obtained which are dried by a stream of hot air or nitrogen. Alternatively the spraying can be achieved via a rotating disc. In a preferred embodiment a stream of hot air or nitrogen is used having a temperature of 100 to 500° C., particularly preferred 110 to 350° C. Spray-drying is normally conducted directly with the mixture of step (A) without any intermediate steps. Spray-drying normally gives rise to spherical particles and agglomerates having an average diameter of <0.5 mm. In order to obtain spherical particles and agglomerates having a diameter of 10-30 μm, in a preferred embodiment of step (B) diluted solutions can be used and spray-drying of these diluted solutions can be conducted using high pressure nozzles.

In a second embodiment, step (B) of the process according to the present invention is conducted by freeze-drying. The sprayed mixture is therefore sprayed into, for example liquid nitrogen. The spherical particles and agglomerates obtained therefrom can be dried in vacuum at a low temperature.

Step (B) of the process according to the present invention can be conducted under an inert atmosphere. Suitable inert gases are chosen from nitrogen or noble gases like helium or argon. A preferred inert gas is nitrogen.

The drying in step (B) is conducted in order to obtain a dry solid. In a preferred embodiment, the solids obtained show an amorphous structure in the X-ray pattern. In a preferred embodiment, the drying in step (B) of the process according to the present invention is conducted in order to obtain a solid having an amount of water present in the solid of less than 40% by weight, preferably less than 35% by weight, particularly preferably less than 25% by weight.

After step (B) the desired solid is present in preferably spherical particles or agglomerates having a diameter of 3 to 200 μm, preferably 5 to 100 μm, very preferably 8 to 50 μm.

Step (C):

Step (C) of the process according to the present invention comprises calcining the solid compound obtained from step (B) at a temperature of 300 to 950° C. Step (C) is preferably conducted at a temperature of 375 to 900° C., particularly preferably at a temperature of 400 to 850° C.

Calcination is preferably conducted under an inert gas atmosphere. Examples of inert gases are nitrogen or noble gases like helium and/or argon. In a preferred embodiment, nitrogen is used in step (C) of the process according to the present invention.

One advantage of the process according to the present invention is that calcination can be conducted under an inert atmosphere and no need exists to conduct step (C) under a reducing atmosphere according to the prior art. Based thereon the process according to the present invention can be conducted in a more time and cost saving way. The absence of a reducing agent, for example hydrogen, avoids the presence of explosive gaseous mixtures.

Step (C) of the process according to the present invention is conducted for a time of 0.1 to 5 hours, preferably 0.5 to 3 hours. In a very preferred embodiment of step (C), the temperature is slowly increased during a period of 0.1 to 2 hours, preferably 0.5 to 1.5 hours, then, the temperature is hold for a period of 0.1 to 2 hours, preferably 0.5 to 1.5 hours, and at the end the temperature is decreased to room temperature.

In a preferred embodiment, the product obtained from step (C) consists essentially of spherical particles or agglomerates having a diameter of 3 to 200 µm, preferably 5 to 100 µm, very preferred 8 to 50 µm.

The temperature of calcination has a significant impact onto the specific surface of the compound according to general formula (I). Low temperatures during calcination give normally rise to high specific surface area. High temperatures during calcination give usually rise to low specific surface area.

The spherical particles or agglomerates that are obtained from step (C) of the process according to the present invention have in general a specific BET surface area of 0.01 to 30 $m^2/g$, preferably 0.1 to 20 $m^2/g$.

Suitable apparatuses for step (C) are known to the person having ordinary skill in the art, one example is a rotary furnace. The residence time in a rotary furnace is based on the inclination and the rotating speed of the furnace. A person having ordinary skill in the art does know how a suitable residence time is adjusted in the rotary furnace. In a preferred embodiment the solid that is calcinated in step (C) of the process according to the present invention is moved during calcination, for example in a fluidized bed reactor or in a rotary furnace. The solid can also be stirred during calcination.

Step (C) of the process according to the present invention is in general conducted under a pressure that is suitable that preferably complete conversion into the desired products is obtained. In a preferred embodiment step (C) is conducted under a pressure which is slightly higher than atmospheric pressure, in order to prevent oxygen penetrating the reactor from the outside. This slightly increased atmospheric pressure is preferably caused by at least one inert gas that is streaming over the solid compound that is calcinated in this step.

The process according to the present invention can be conducted continuously or discontinuously. In a preferred embodiment the process according to the present invention is conducted discontinuously.

In a preferred embodiment of the process according to the present application, the solid compound obtained from step (B) or from step (C) is milled prior to step (C) and/or after step (C), in order to obtain crystalline agglomerates having the required size. Suitable mills are known to a person having ordinary skill in the art. Examples are jet mills which supply very low abrasion, preferably under the use of nitrogen and/or air.

The present invention further relates to a compound according to general formula (I) as mentioned above, preparable by the process according to the present invention. The compounds according to general formula (I) preparable by the process according to the present invention show improved crystallinity compared to compounds prepared by processes according to the prior art. In addition the size distribution obtained is narrower compared to the prior art. The crystallinity of the solids obtained is improved and the solids obtained have an improved dispersion of ingredients. Moreover, the invention enables a decrease of the usually applied high calcination temperature of 800° C. and more to prepare a monophasic lithiumvanadiumphosphate. A decrease of the calcination temperature leads to a more finely devided material with a very narrow size distribution of the crystallites, supplying improved Li-ion diffusivity in the charging and discharging of a Li-ion battery. By improving the Li-ion diffusivity the power characteristics and additionally the capacity of a Li-ion battery can be increased.

Because of this fact the compounds of general formula (I) preparable by the process according to the present invention are particularly suitable for the use for the preparation of a cathode of a lithium-ion battery or an electrochemical cell. Therefore the present invention also relates to the use of a compound of general formula (I) preparable by the process according to the present invention for the preparation of a cathode of a lithium-ion battery or an electrochemical cell.

The present invention further relates to a cathode for a lithium-ion battery, comprising at least one compound according to general formula (I) preparable by the process according to the present invention. To obtain a cathode as mentioned above the compound according to general formula (I) is mixed with at least one electrically conducting material, described for example in WO 2004/082047.

Suitable electrically conducting materials are for example carbon black, graphite, carbon fibres, carbon nanofibres, carbon nanotubes or electrically conducting polymers. Typically 2.0 to 40% by weight of the at least one electrically conducting material are used together with the compound according to general formula (I) in the cathode. To obtain the cathode the electrically conducting material and the compound according to general formula (I) are mixed, optionally in the presence of an organic solvent and optionally in the presence of an organic binder, for example polyisobutene, and this mixture is optionally formed and dried. A temperature of 80 to 150° C. is applied in the drying step.

In a preferred embodiment the at least one electrically conducting material is added during the preparation of compounds according to general formula (I) as mentioned above. In a preferred embodiment, the at least one electrically conducting material is added to the mixture of the starting materials in the preparation of the compound according to general formula (I).

Therefore, the present invention also relates to a process for the preparation of a mixture comprising at least one compound according to general formula (I) as defined above and at least one electrically conducting material comprising the following steps (D) providing an essentially aqueous mixture comprising at least one electrically conducting material, at least one lithium-comprising compound, at least one vanadium-comprising compound, in which vanadium has the oxidation state +5 and/or +4, and at least one $M^1$-comprising compound, if present, and/or at least one $M^2$-comprising compound, if present, and at least one reducing agent which is oxidized to at least one compound comprising at least one phosphorous atom in oxidation state +5, (E) drying the mixture provided in step (D), in order to obtain a solid compound and (F) calcining the solid compound obtained from step (E) at a temperature of 300 to 950° C.

In a preferred embodiment of this process according to the present invention, the essentially aqueous solution which is provided in step (D) additionally comprises at least one compound comprising at least one phosphorous atom in oxidation state +5.

The lithium-, $M^1$ and/or $M^2$-comprising compounds, the vanadium-comprising compounds, the at least one reducing agent which is oxidized to at least one compound comprising at least one phosphorous atom in oxidation state +5, the optionally present at least one compound comprising at least one phosphorous atom in oxidation state +5, the electrically conductive materials, the apparatuses and the process parameters of the steps (D) to (F) correspond to the ones described above. In addition to the at least one reducing agent which is oxidized to at least one compound comprising at least one phosphorous atom in oxidation state +5, the optionally present at least one compound comprising at least one phosphorous atom in oxidation state +5, at least one additional reducing agent can be added in a preferred embodiment, as mentioned and defined above.

In a preferred embodiment the electrically conducting material is chosen from the group consisting of carbon black, graphite, carbon fibres, carbon nanofibres, carbon nanotubes, electrically conducting polymers or mixtures thereof.

If carbon black, graphite or substances essentially consisting of carbon are used as electrically conducting materials in step (D), these materials are preferably suspended in a mixture, preferably an essentially aqueous solution, of the other components. This can be achieved by direct addition of these electrically conducting materials to the mixture of the other components. Alternatively, carbon black, graphite or substances essentially consisting of carbon can be suspended in an aqueous solution of hydrogen peroxide, and this suspension can then be added to a solution of one or more components as mentioned above. Treatment with hydrogen peroxide normally improves the wettability of carbon with water and makes it possible to obtain carbon containing suspensions having an improved stability, i.e. having a lower tendency for demixing. In addition the homogenous dispersion of the electrically conducting material in the mixture is improved.

The present invention also relates to a mixture, comprising at least one compound according to general formula (I) as defined above and at least one electrically conducting material, preparable by a process as mentioned above. In contrast to materials according to the prior art, these mixtures according to the present invention show an improved dispersion of the at least one electrically conducting material in the mixture.

Therefore, the present invention also relates to the use of a mixture as mentioned above for the preparation of a cathode of a lithium-ion battery or an electrochemical cell.

The present invention also relates to a cathode for a lithium-ion battery, comprising a mixture as mentioned above.

For the preparation of a cathode using the compound according to general formula (I) as mentioned above or a mixture comprising the compound according to general formula (I) and at least one electrically conducting material as mentioned above, in a preferred embodiment the following binders are used:

Polyethyleneoxide (PEO), cellulose, polyethylene, polypropylene, polytetrafluoroethylene, polyacrylonitrile-methylmethacrylate, styrene-butadiene-copolymers, tetrafluoroethylene-hexyluoropropylene-copolymers, polyvinylidenefluoride-hexafluoropropylene-copolymers (PVdF-HFP), perfluoroalkyl-vinylether-copolymers, vinylidenefluoride-chlorotrifluoroethylene-copolymers, ethylene-chlorofluoroethylene-copolymers, ethylene-acrylic acid-copolymers (with and without sodium ions included), ethylene-methacrylic acid (with and without sodium ions included), polyimides and polyisobutene.

The binder is normally added in an amount of 1 to 10% by weight, preferably 2 to 8% by weight, particularly preferred 3 to 7% by weight, in each case based on the whole cathode material.

The mixture comprising at least one compound according to general formula (I) and at least one electrically conducting material have preferably a BET surface area of 0.5 to 50 $m^2/g$.

FIGURES

The present invention is further illustrated by the following examples:

EXAMPLES

Example 1

$Li_3V_2(PO_4)_3$ from $LiOH*H_2O$, $V_2O_5$, $H_3PO_3$, $H_3PO_4$ ("stoichiometric")

($V_2O_5$ is reduced by $H_3PO_3$ to $V^{3+}$, $H_3PO_3$ is oxidized to $PO_4^{3-}$ and water)

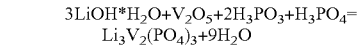

$$3LiOH*H_2O+V_2O_5+2H_3PO_3+H_3PO_4=Li_3V_2(PO_4)_3+9H_2O$$

Figure 1:
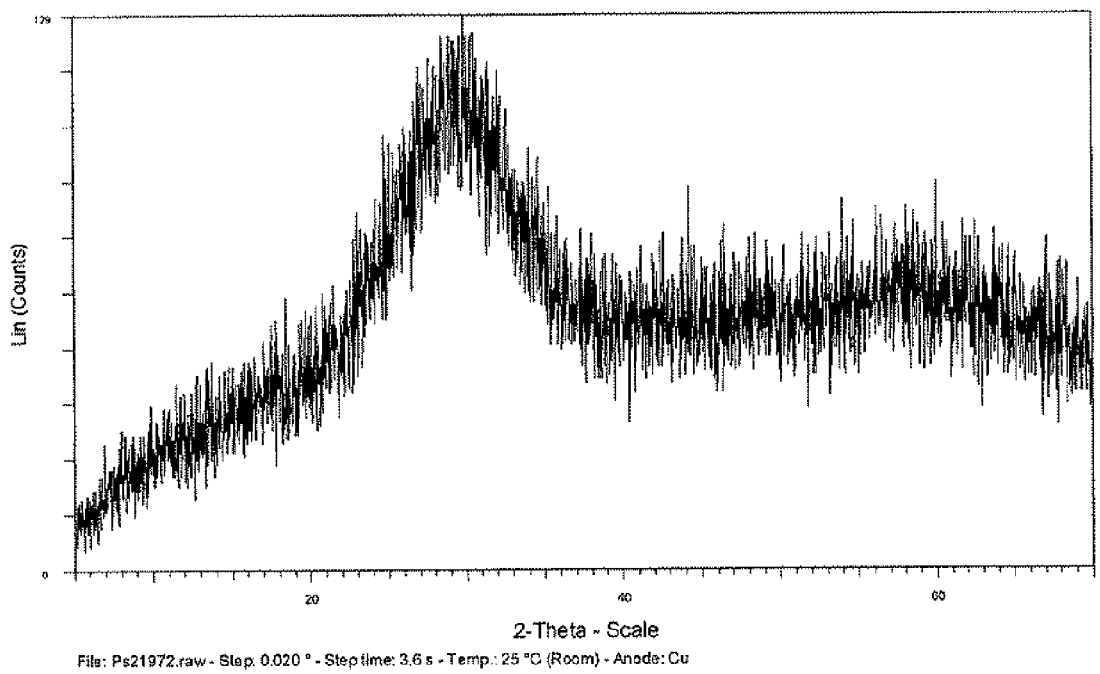
FIG. 1 shows a X-ray powder diffraction pattern of the spray dried powder. The sample is X-ray amorphous.

In a 10 l-glass-reactor which is heatable from the outside, 6 l water are placed at 80° C. under streaming $N_2$ (50 NL/h). The streaming $N_2$-cover is maintained during the further process. Under stirring 262.45 g $LiOH*H_2O$ (57.49% LiOH, 6.3 mol Li, Chemetall GmbH, D-60487 Frankfurt, Germany) are added and dissolved to give a clear, colourless solution. 363.76 g $V_2O_5$ (99.97%, 2 Mol $V_2O_5$, GfE Umwelttechnik GmbH, D-90431 Nürnberg, Germany) are added. After dissolution of the $V_2O_5$ a clear, yellow-coloured solution is obtained. 334.69 g $H_3PO_3$ (98%, 4 mol P, Acros Organics, B-2440 Geel, Belgium) are added to this solution during 0.5 minutes. A clear, orange-coloured solution is obtained. 230.58 g $H_3PO_4$ (85%, 2 Mol P, Fa. Riedel-de-Haen, D-30926 Seelze) are added. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray-powder obtained therefrom shows an amorphous structure in the X-ray powder diffraction pattern (FIG. 1).

50 g of the obtained spray powder are subsequently added to a continuously rotating (7 rpm) 1 l-crystal ball under streaming nitrogen (15 NL/h) in a laboratory rotary furnace (BASF) and heated in one hour to an end temperature T, is hold at this temperature T for one hour and is subsequently cooled to room temperature under streaming $N_2$.

Example 1.1

Figure 2:
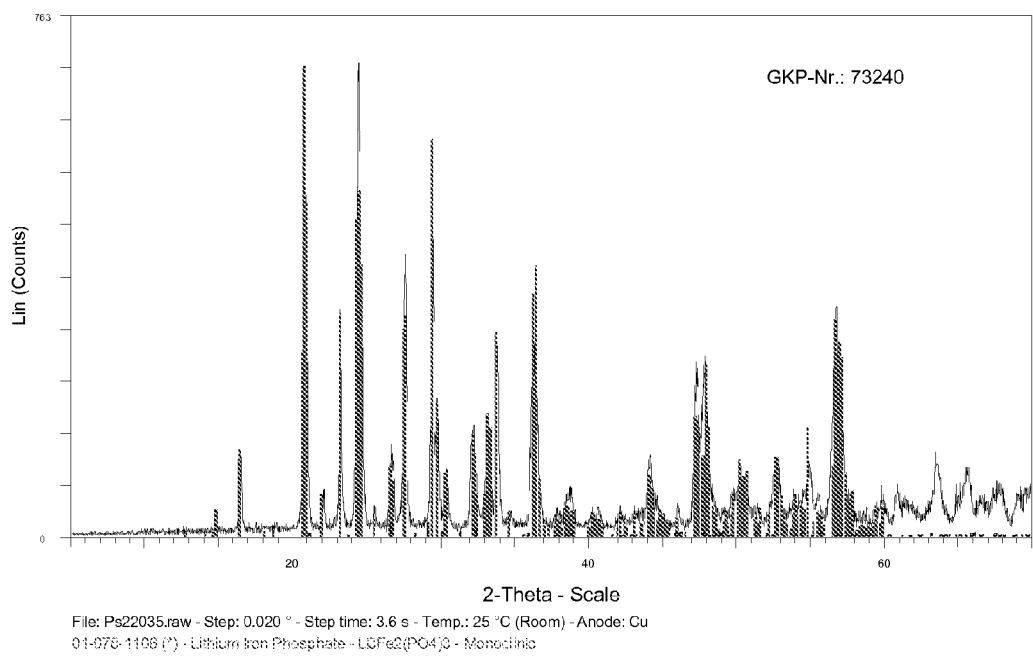
FIG. 2 shows X-ray powder diffraction pattern of single-phase $Li_3V_2(PO_4)_3$ (isostructural with $Li_3Fe_2(PO_4)_3$, BET=11.0 $m^2/g$) prepared by calcination of the amorphous, spray-dried powder (FIG. 1) at 400° C. under nitrogen.
Figure 3:
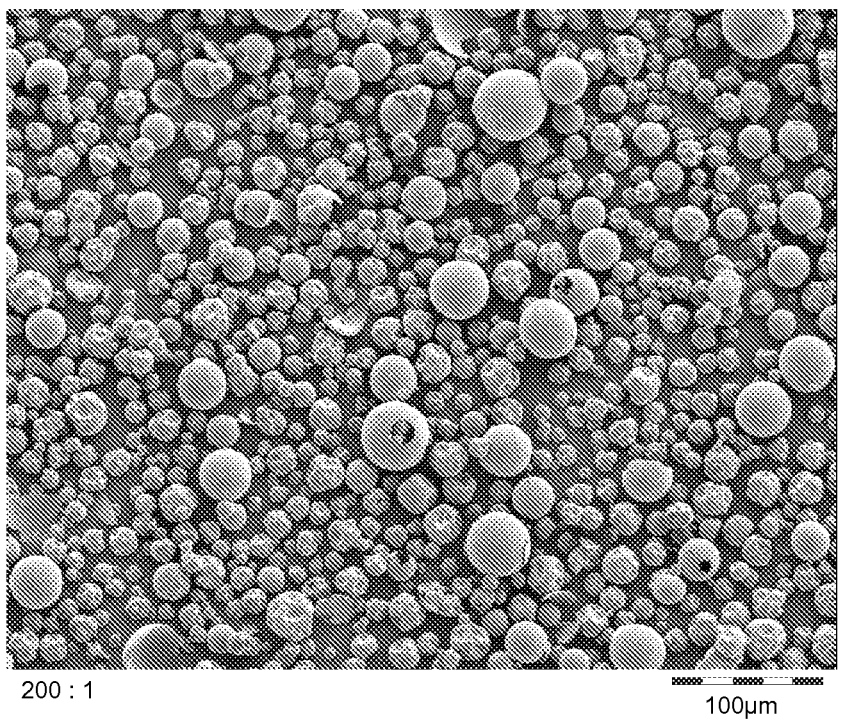
FIG. 3 shows an image by scanning electron microscopy (SEM) of the monophasic $Li_3V_2(PO_4)_3$ (isostructural with $Li_3Fe_2(PO_4)_3$, BET=11.0 $m^2/g$) prepared by calcination of the amorphous, spray-dried powder (FIG. 1) at 400° C. under nitrogen.

The end temperature T of 400° C. gives rise to a powder having a BET-surface of 11.0 m²/g and a X-ray powder diffraction pattern, showing essentially the monophasic structure of $Li_3Fe_2(PO_4)_3$ being iso-structural with the product $Li_3V_2(PO_4)_3$ (FIG. 2). Scanning electron microscopy shows that the powder has a spherical habitus having a medium spherical size of about 30 µm (FIG. 3).

Example 1.2

The end temperature T of 500° C. gives rise to a powder having a BET-surface of 2.2 m²/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 µm.

Example 1.3

Figure 4:
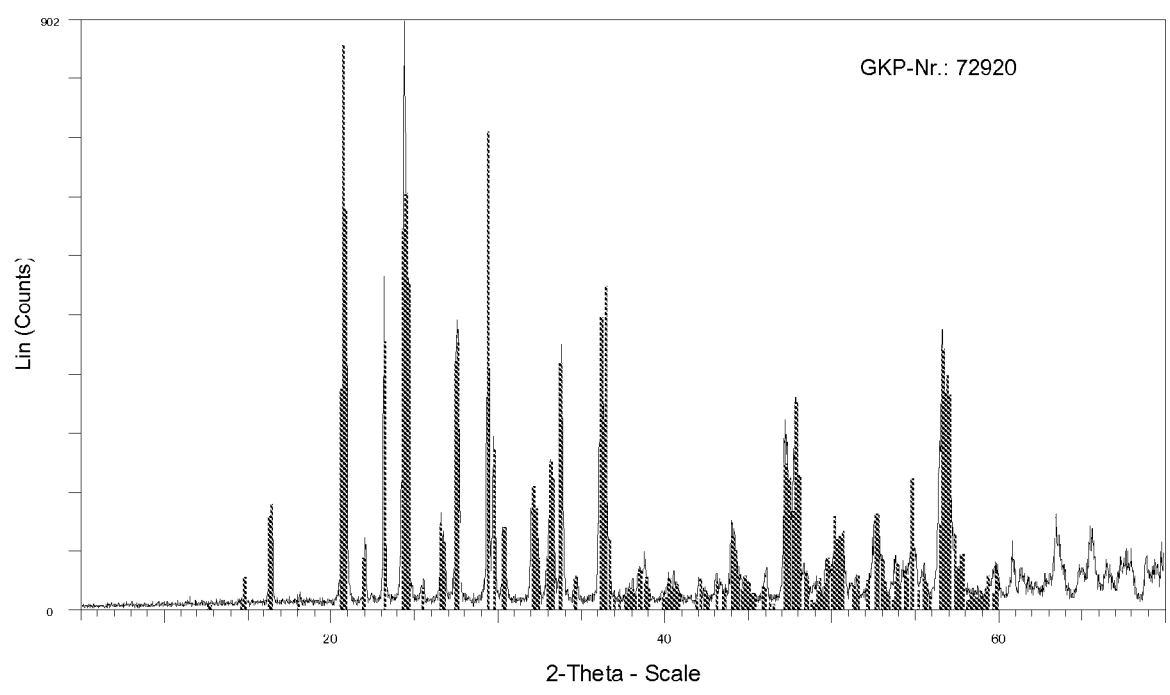
FIG. 4 shows X-ray powder diffraction pattern of monophasic $Li_3V_2(PO_4)_3$ (isostructural with $Li_3Fe_2(PO_4)_3$, BET=0.5 $m^2/g$) prepared by calcination of the amorphous, spray-dried powder (FIG. 1) at 600° C. under nitrogen.

The end temperature T of 600° C. gives rise to a powder having a BET-surface of 0.5 m²/g and a X-ray powder diffraction pattern, showing essentially the monophasic structure of $Li_3Fe_2(PO_4)_3$ being iso-structural with the product $Li_3V_2(PO_4)_3$ (FIG. 4). Scanning electron microscopy shows that the powder has a spherical habitus having a medium spherical size of about 30 µm.

Example 1.4

The end temperature T of 700° C. gives rise to a powder having a BET-surface of 0.2 m²/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 µm.

Example 2

$Li_3V_2(PO_4)_3$ from $LiOH*H_2O$, $V_2O_5$, $H_3PO_3$, $H_3PO_4$ ("$H_3PO_3$ in excess")

($V_2O_5$ is reduced by $H_3PO_3$ to $V^{3+}$, $H_3PO_3$ is oxidized to $PO_4^{3-}$ and water)

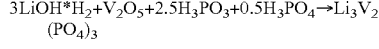

$$3LiOH*H_2+V_2O_5+2.5H_3PO_3+0.5H_3PO_4 \rightarrow Li_3V_2(PO_4)_3$$

In a 10 l-glass-reactor which is heatable from the outside, 6 l water are placed at 80° C. under streaming $N_2$ (50 NL/h). The streaming $N_2$-cover is maintained during the further process. Under stirring 262.45 g LiOH*$H_2O$ (57.49% LiOH, 6.3 mol Li, Chemetall GmbH, D-60487 Frankfurt, Germany) are added and dissolved to give a clear, colourless solution. 363.76 g $V_2O_5$ (99.97%, 2 Mol $V_2O_5$, GfE Umwelttechnik GmbH, D-90431 Nürnberg, Germany) are added. After dissolution of the $V_2O_5$ a clear, yellow-coloured solution is obtained. 418.37 g $H_3PO_3$ (98%, 5 mol P, Acros Organics, B-2440 Geel, Belgium) are added to this solution during 0.5 minutes. A clear, orange-coloured solution is obtained. 115.29 g $H_3PO_4$ (85%, 1 mol P, Riedel-de-Haen, D-30926 Seelze, Germany) are added. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray-powder obtained therefrom shows an amorphous structure in the XRD-powder diagram.

50 g of the obtained spray powder are subsequently added to a continuously rotating (7 rpm) 1 l-crystal ball under streaming nitrogen (15 NL/h) in a laboratory rotary tube furnace (BASF) and heated in one hour to an end temperature T, is hold at this temperature T for one hour and is subsequently cooled to room temperature under streaming $N_2$.

Example 2.1

The end temperature T of 450° C. gives rise to a powder having a BET-surface of 7.7 m²/g and a X-ray powder diffraction pattern, showing essentially the monophasig structure of $Li_3Fe_2(PO_4)_3$ being iso-structural with the product $Li_3V_2(PO_4)_3$. Scanning electron microscopy shows that the powder has a spherical habitus having a medium spherical size of about 30 µm.

Example 2.2

The end temperature T of 500° C. gives rise to a powder having a BET-surface of 6.9 m²/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 µm.

Example 2.3

The end temperature T of 600° C. gives rise to a powder having a BET-surface of 1.2 m²/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 µm.

Example 2.4

The end temperature T of 700° C. gives rise to a powder having a BET-surface of 0.5 m²/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 µm.

Example 3

[$Li_3V_2^{3+}(PO_4)_3$+carbon black] from LiOH*$H_2O$, $V_2O_5$, $H_3PO_3$, $H_3PO_4$, carbon black ("stoichiometric")

($V_2O_5$ is reduced by $H_3PO_3$ to $V^{3+}$, $H_3PO_3$ is oxidized to $PO_4^{3-}$ and water)

Example 3.1

Target $Li_3V_2^{3+}(PO_4)_3$ with 2.5% by weight C 1 l $H_2O$ is placed in a 3-l-beaker under stirring at room temperature. 21.1 g carbon black (Timcal Super P Li, Timcal Deutschland GmbH, D-40212 Düsseldorf, Germany) are added to the water, wherein the carbon black swims on the surface of the water. 500 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 4500 ml water at room temperature, which is present in the 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97%, 2 Mol $V_2O_5$, GfE Umwelttechnik GmbH, D-90431 Nürnberg) are added slowly. The resulting suspension is heated to 90° C. Subsequently, 334.69 g $H_3PO_3$ (98%, 4 Mol P, Cross Organics, B-2440 Geel, Belgien) are added. After further 20 minutes of stirring, 230.58 g $H_3PO_4$ (85%, 2 Mol P, Riedel-de-Haen, D-30926 Seelze, Germany) are added. The obtained aqueous mixture is stirred for 16 hours at 90° C. under maintaining of streaming nitrogen. Subsequently, the solution is dried in a spray-dryer (type Minor MM, Fa. Niro, Danmark) under nitrogen (inlet temperature=330° C., outlet temperature=106° C.).

50 g of the grey-black spray-powder obtained therefrom are heated under streaming nitrogen (15 NL/h) in a continuously rotating (7 rpm) 1-l-quartz ball in a laboratory rotary furnace (BASF) in one hour to an end temperature T, held at this temperature for one hour and is subsequently cooled to room temperature under streaming $N_2$.

Powders resulting from T=500° C., 600° C., 700° C. and 750° C. show the monophasic structure of $Li_3Fe_2(PO_4)_3$ being isostructural with the product $Li_3V_2(PO_4)_3$. Scanning electron microscopy shows that the powder in all cases has a spherical habitus having a medium spherical size of about 30 μm. The analyzed C-content in all cases is 2.4-2.5% by weight.

Example 3.2

Target $Li_3V_2^{3+}(PO_4)_3$ with 6.5% by weight C 1 l $H_2O$ is placed in a 3-l-beaker under stirring at room temperature. 56.8 g carbon black (Timcal Super P Li, Timcal Deutschland GmbH, D-40212 Düsseldorf, Germany) are added to the water, wherein the carbon black swims on the surface of the water. 150 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 2850 ml water at room temperature, which is present in 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97% $V_2O_5$, 2 Mol $V_2O_5$, GfE Umwelttechnik GmbH, D-90431 Nürnberg, Germany) are added slowly. The resulting suspension is heated to 90° C. Subsequently, 334.69 g $H_3PO_3$ (98%, 4 Mol P, Cross Organics, B-2440 Geel, Belgien) are added. After further 20 minutes of stirring, 230.58 g $H_3PO_4$ (85%, 2 Mol P, Riedel-de-Haen, D-30926 Seelze, Germany) are added. The obtained aqueous mixture is stirred for 16 hours at 90° C. under maintaining of streaming nitrogen. Subsequently, the solution is dried in a spray-dryer (type Minor MM, Fa. Niro, Danmark, under nitrogen (inlet temperature=330° C., outlet temperature=106° C.).

50 g of the grey-black spray powder obtained therefrom are heated under streaming nitrogen (15 NL/h) in a continuously rotating (7 rpm) 1-l-quartz ball in a laboratory rotary furnace (BASF) in one hour to an end temperature T=700° C., held at this temperature for one hour and is subsequently cooled to room temperature under streaming $N_2$. The powder resulting therefrom shows the monophasic structure of $Li_3Fe_2(PO_4)_3$ being isostructural with the product $Li_3V_2(PO_4)_3$. Scanning electron microscopy shows that the powder has a spherical habitus having a medium spherical size of about 30 μm. The analyzed C-content is 6.4% by weight.

Example 3.3

Target $Li_3V_2^{3+}(PO_4)_3$ with 9.5% by weight C 1 l $H_2O$ is placed in a 3-l-beaker under stirring at room temperature. 86.7 g carbon black (Timcal Super P Li, Timcal Deutschland GmbH, D-40212 Düsseldorf, Germany) are added to the water, wherein the carbon black swims on the surface of the water. 200 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 2800 ml water at room temperature, which is present in 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97%, 2 Mol $V_2O_5$, GfE Umwelttechnik GmbH, D-90431 Nürnberg, Germany) are added slowly. The resulting suspension is heated to 90° C. Subsequently, 334.69 g $H_3PO_3$ (98%, 4 Mol P, Cross Organics, B-2440 Geel, Belgien) are added. After further 20 minutes of stirring, 230.58 g $H_3PO_4$ (85%, 2 Mol P, Fa. Riedel-de-Haen, D-30926 Seelze, Germany) are added. The obtained aqueous mixture is stirred for 16 hours at 90° C. under maintaining of streaming nitrogen. Subsequently, the solution is dried in a spray-dryer (type Minor MM, Fa. Niro, Danmark) under nitrogen (inlet temperature=330° C., outlet temperature=106° C.).

50 g of the grey-black spray powder obtained therefrom are heated under streaming nitrogen (15 NL/h) in a continuously rotating (7 rpm) 1-l-quartz ball in a laboratory rotary furnace (BASF) in one hour to an end temperature T=700° C., held at this temperature for one hour and is subsequently cooled to room temperature under streaming $N_2$. The powder resulting therefrom shows the monophasic structure of $Li_3Fe_2(PO_4)_3$ being isostructural with the product $Li_3V_2(PO_4)_3$. Scanning electron microscopy shows that the powder has a spherical habitus having a medium spherical size of about 30 μm. The analyzed C-content is 9.3% by weight.

Example 3.4

Target $Li_3V_2^{3+}(PO_4)_3$ with 13.0% by weight C 1 l $H_2O$ is placed in a 3-l-beaker under stirring at room temperature. 122.1 g carbon black (Timcal Super P Li, Timcal Deutschland GmbH, D-40212 Düsseldorf, Germany) are added to the water, wherein the carbon black swims on the surface of the water. 250 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 1750 ml water at room temperature, which is present in 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97%, 2 Mol $V_2O_5$, GfE Umwelttechnik GmbH, D-90431 Nürnberg, Germany) are added slowly. The resulting suspension is heated to 90° C. Subsequently, 334.69 g $H_3PO_3$ (98%, 4 Mol P, Cross Organics, B-2440 Geel, Belgien) are added. After further 20 minutes of stirring, 230.58 g $H_3PO_4$ (85%, 2 Mol P, Fa. Riedel-de-Haen, D-30926 Seelze, Germany) are added. The obtained aqueous mixture is stirred for 16 hours at 90° C. under maintaining of streaming nitrogen. Subsequently, the solution is dried in a spray-dryer (type Minor MM, Fa. Niro, Danmark) under nitrogen (inlet temperature=330° C., outlet temperature=106° C.).

50 g of the grey-black spray powder obtained therefrom are heated under streaming nitrogen (15 NL/h) in a continuously rotating (7 rpm) 1-l-quartz ball in a laboratory rotary furnace (BASF) in one hour to an end temperature T=700° C., held at this temperature for one hour and is subsequently cooled to room temperature under streaming $N_2$. The powder resulting therefrom shows the monophasic structure of $Li_3Fe_2(PO_4)_3$ being isostructural with the product $Li_3V_2(PO_4)_3$. Scanning electron microscopy shows that the powder has a spherical habitus having a medium spherical size of about 30 μm. The analyzed C-content is 12.8% by weight.

Example 4

[$Li_3V_2^{3+}(PO_4)_3$+carbon black] from LiOH*$H_2O$, $V_2O_5$, $H_3PO_3$, $H_3PO_4$ ("$H_3PO_3$ in excess")

($V_2O_5$ is reduced by $H_3PO_3$ to $V^{3+}$, $H_3PO_3$ is oxidized to $PO_4^{3-}$ and water)

Example 4.1

Target $Li_3V_2^{3+}(PO_4)_3$ with 2.5% by weight C 1 l $H_2O$ is placed in a 3-l-beaker under stirring at room temperature. 21.1 g carbon black (Timcal Super P Li, Timcal Deutschland GmbH, D-40212 Düsseldorf, Germany) are added to the water, wherein the carbon black swims on the surface of the water. 500 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 4500 ml water at room temperature, which is present in 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97%, 2 Mol $V_2O_5$, GfE Umwelttechnik GmbH, D-90431 Nürnberg, Germany) are added slowly. The resulting suspension is heated to 90° C. Subsequently, 376.53 g $H_3PO_3$ (98%, 4.5 Mol P, Fa. Cross Organics, B-2440 Geel, Belgien) are added. After further 20 minutes of stirring, 172.94 g $H_3PO_4$ (85%, 1.5 Mol P, Fa. Riedel-de-Haen, D-30926 Seelze) are added. The obtained aqueous mixture is stirred for 16 hours at 90° C. under maintaining of streaming nitrogen. Subsequently, the solution is dried in a spray-dryer (type Minor MM, Fa. Niro, Danmark) under nitrogen (inlet temperature=330° C., outlet temperature=106° C.).

50 g of the grey-black spray powder obtained therefrom are heated under streaming nitrogen (15 NL/h) in a continuously rotating (7 rpm) 1-l-quartz ball in a laboratory rotary furnace (BASF) in one hour to an end temperature T, held at this temperature for one hour and is subsequently cooled to room temperature under streaming $N_2$. Powders resulting from T=500° C., 600° C., 700° C. and 750° C. show the monophasic structure of $Li_3Fe_2(PO_4)_3$ being isostructural with the product $Li_3V_2(PO_4)_3$. Scanning electron microscopy shows that the powder has a spherical habitus having a medium spherical size of about 30 μm. The analyzed C-content in all cases is 2.5% by weight.

Example 4.2

Target $Li_3V_2^{3+}(PO_4)_3$ with 6.5% by weight C 1 l $H_2O$ is placed in a 3-l-beaker under stirring at room temperature. 56.8 g carbon black (Timcal Super P Li, Timcal Deutschland GmbH, D-40212 Düsseldorf, Germany) are added to the water, wherein the carbon black swims on the surface of the water. 150 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 2850 ml water at room temperature, which is present in 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97%, 2 Mol $V_2O_5$, GfE Umwelttechnik GmbH, D-90431 Nürnberg, Germany) are added slowly. The resulting suspension is heated to 90° C. Subsequently, 351.42 g $H_3PO_3$ (98%, 4.2 Mol P, Cross Organics, B-2440 Geel, Belgien) are added. After further 20 minutes of stirring, 207.52 g $H_3PO_4$ (85%, 1.8 Mol P, Fa. Riedel-de-Haen, D-30926 Seelze, Germany) are added. The obtained aqueous mixture is stirred for 16 hours at 90° C. under maintaining of streaming nitrogen. Subsequently, the solution is dried in a spray-dryer (type Minor MM, Fa. Niro, Danmark) under nitrogen (inlet temperature=330° C., outlet temperature=106° C.).

50 g of the grey-black spray powder obtained therefrom are heated under streaming nitrogen (15 NL/h) in a continuously rotating (7 rpm) 1-l-quartz ball in a laboratory rotary furnace (BASF) in one hour to an end temperature T=700° C., held at this temperature for one hour and is subsequently cooled to room temperature under streaming $N_2$. The powder resulting therefrom shows the monophasic structure of $Li_3Fe_2(PO_4)_3$ being isostructural with the product $Li_3V_2(PO_4)_3$. Scanning electron microscopy shows that the powder has a spherical habitus having a medium spherical size of about 30 μm. The analyzed C-content is 6.5% by weight.

Example 4.3

Target $Li_3V_2^{3+}(PO_4)_3$ with 9.5% by weight C 1 l $H_2O$ is placed in a 3-l-beaker under stirring at room temperature. 86.8 g carbon black (Timcal Super P Li, Timcal Deutschland GmbH, D-40212 Düsseldorf, Germany) are added to the water, wherein the carbon black swims on the surface of the water.

200 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 2800 ml water at room temperature, which is present in 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97%, 2 Mol $V_2O_5$, GfE Umwelttechnik GmbH, D-90431 Nürnberg, Germany) are added slowly. The resulting suspension is heated to 90°. Subsequently, 351.42 g $H_3PO_3$ (98%, 4.2 Mol P, Cross Organics, B-2440 Geel, Belgien) are added. After further 20 minutes of stirring, 207.52 g $H_3PO_4$ (85%, 1.8 Mol P, Fa. Riedel-de-Haen, D-30926 Seelze) are added. The obtained aqueous mixture is stirred for 16 hours at 90° C. under maintaining of streaming nitrogen. Subsequently, the solution is dried in a spray-dryer (type Minor MM, Fa. Niro, Danmark) under nitrogen (inlet temperature=330° C., outlet temperature=106° C.).

50 g of the grey-black spray powder obtained therefrom are heated under streaming nitrogen (15 NL/h) in a continuously rotating (7 rpm) 1-l-quartz ball in a laboratory rotary furnace (BASF) in one hour to an end temperature T=700° C., held at this temperature for one hour and is subsequently cooled to room temperature under streaming $N_2$. The powder resulting therefrom shows the monophasic structure of $Li_3Fe_2(PO_4)_3$ being isostructural with the product $Li_3V_2(PO_4)_3$. Scanning electron microscopy shows that the powder has a spherical habitus having a medium spherical size of about 30 μm. The analyzed C-content is 9.5% by weight.

Example 4.4

Target $Li_3V_2^{3+}(PO_4)_3$ with 13.0% by weight C 1 l $H_2O$ is placed in a 3-l-beaker under stirring at room temperature. 122.1 g carbon black (Timcal Super P Li, Timcal Deutschland GmbH, D-40212 Düsseldorf, Germany) are added to the water, wherein the carbon black swims on the surface of the water. 250 ml aqueous $H_2O_2$-solution (30%, Merck GmbH, D-64293 Darmstadt, Germany) are added under further stirring, wherein the carbon black disperses into the water. The black, aqueous carbon black-dispersion obtained is added to 1750 ml water at room temperature, which is present in 10 l-glass reactor heatable from the outside. The obtained mixture is heated to 60° C. under streaming $N_2$ (50 NL/h) and held at this temperature for 2 h. To this mixture which is tempered to 60° C. are added 262.45 g LiOH*$H_2O$ (57.49% LiOH, 6.3 Mol Li, Chemetall GmbH, D-60487 Frankfurt, Germany) under stirring. To the resulting mixture, 363.76 g $V_2O_5$ (99.97%, 2 Mol $V_2O_5$, GfE Umwelttechnik GmbH, D-90431 Nürnberg, Germany) are added slowly. The resulting suspension is heated to 90° C. Subsequently, 351.42 g $H_3PO_3$ (98%, 4.2 Mol P, Cross Organics, B-2440 Geel, Belgien) are added. After further 20 minutes of stirring, 207.52 g $H_3PO_4$ (85%, 1.8 Mol P, Fa. Riedel-de-Haen, D-30926 Seelze, Germany) are added. The obtained aqueous mixture is stirred for 16 hours at 90° C. under maintaining of streaming nitrogen. Subsequently, the solution is dried in a spray-dryer (type Minor MM, Fa. Niro, Danmark) under nitrogen (inlet temperature=330° C., outlet temperature=106° C.).

50 g of the grey-black spray powder obtained therefrom are heated under streaming nitrogen (15 NL/h) in a continuously rotating (7 rpm) 1-l-quartz ball in a laboratory rotary furnace (BASF) in one hour to an end temperature T=700° C., held at this temperature for one hour and is subsequently cooled to room temperature under streaming $N_2$. The powder resulting therefrom shows the monophasic structure of $Li_3Fe_2(PO_4)_3$ being isostructural with the product $Li_3V_2(PO_4)_3$. Scanning electron microscopy shows that the powder has a spherical habitus having a medium spherical size of about 30 μm. The analyzed C-content is 13.0% by weight.

Example 5

$Li_3V_2(PO_4)_3$ from LiOH*$H_2O$, $V_2O_5$, $N_2H_4$*$H_2O$, $H_3PO_3$, $H_3PO_4$ formal: $V_2O_5 + 0.5 N_2H_4*H_2 = "V_2O_4" + 0.5 N_2 + 2 H_2O$ $3 LiOH*H_2 + "V_2O_4" + 1 H_3PO_3 + 2 H_3PO_4 = Li_3V_2(PO_4)_3 + 9 H_2O$ In a 10 l-glass-reactor which is heatable from the outside, 6 l water are placed at 80° C. under streaming $N_2$ (50 NL/h). The streaming $N_2$-cover is maintained during the further process. Under stirring 262.45 g LiOH*$H_2O$ (57.49% LiOH, 6.3 mol Li, Chemetall GmbH, D-60487 Frankfurt, Germany) are added and dissolved to give a clear, colourless solution. 363.76 g $V_2O_5$ (99.97%, 2 mol $V_2O_5$, GfE Umwelttechnik GmbH, D-90431 Nürnberg, Germany) are added. After dissolution of the $V_2O_5$ a clear, yellow-coloured solution is obtained. 55.07 g $N_2H_4$*$H_2O$ (99.95%, 1.1 mol $N_2H_4$, Merck, D-64295 Darmstadt, Germany) are added to this solution during 15 minutes. Thereupon 167.34 g $H_3PO_3$ (98%, 2 mol P, Acros Organics, B-2440 Geel, Belgium) are added to this solution during 0.5 minutes. 461.16 g $H_3PO_4$ (85%, 4 Mol P, Fa. Riedel-de-Haen, D-30926 Seelze, Germany) are added. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray powder obtained therefrom shows an amorphous structure in the X-ray powder diffraction pattern.

50 g of the obtained spray powder are subsequently added to a continuously rotating (7 rpm) 1 l-crystal ball under streaming nitrogen (15 NL/h) in a laboratory rotary furnace (BASF) and heated in one hour to an end temperature T, is hold at this temperature T for one hour and is subsequently cooled to room temperature under streaming $N_2$.

The end temperature T of 700° C. gives rise to a powder having a BET-surface of 0.5 m²/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 μm.

Example 6

$Li_3V_2(PO_4)_3$ from $LiOH*H_2O$, $V_2O_5$, $C_6H_{12}O_6$ (glucose), $H_3PO_3$, $H_3PO_4$ formal: $V_2O_5+C_6H_{12}O_6$(glucose)→"$V_2O_4$"+"oxidized glucose"

$3LiOH*H_2+$"$V_2O_4$"$+1H_3PO_3+2H_3PO_4=$
$Li_3V_2(PO_4)_3+9H_2O$

In a 10 l-glass-reactor which is heatable from the outside, 6 l water are placed at 80° C. under streaming $N_2$ (50 NL/h). The streaming $N_2$-cover is maintained during the further process. Under stirring 262.45 g $LiOH*H_2O$ (57.49% LiOH, 6.3 mol Li, Chemetall GmbH, D-60487 Frankfurt, Germany) are added and dissolved to give a clear, colourless solution. 363.76 g $V_2O_5$ (99.97%, 2 mol $V_2O_5$, GfE Umwelttechnik GmbH, D-90431 Nürnberg, Germany) are added. After dissolution of the $V_2O_5$ a clear, yellow-coloured solution is obtained. 217.99 g $C_6H_{12}O_6$ (Glucose, 99.9%, 1.1 mol $C_6H_{12}O_6$, Carl Roth GmbH & Co., 76185 Karlsruhe, Germany) are added to this solution during 15 minutes. Thereupon 167.34 g $H_3PO_3$ (98%, 2 mol P, Acros Organics, B-2440 Geel, Belgium) are added to this solution during 0.5 minutes. 461.16 g $H_3PO_4$ (85%, 4 Mol P, Fa. Riedel-de-Haen, D-30926 Seelze, Germany) are added. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray powder obtained therefrom shows an amorphous structure in the XRD-powder diagram.

50 g of the obtained spray powder are subsequently added to a continuously rotating (7 rpm) 1 l-crystal ball under streaming nitrogen (15 NL/h) in a laboratory rotary furnace (BASF) and heated in one hour to an end temperature T, is hold at this temperature T for one hour and is subsequently cooled to room temperature under streaming $N_2$.

The end temperature T of 700° C. gives rise to a powder having a BET-surface of 0.8 m²/g and a X-ray powder diffraction pattern, showing essentially the monophasic structure of $Li_3Fe_2(PO_4)_3$ being iso-structural with the product $Li_3V_2(PO_4)_3$. Scanning electron microscopy shows that the powder has a spherical habitus having a medium spherical size of about 30 μm.

Example 7

$Li_3V_2(PO_4)_3$ from $LiOH*H_2O$, $V_2O_5$, $H_3PO_3$ ("stoichiometric")

$3LiOH*H_2+V_2O_5+3H_3PO_3→Li_3V_2(PO_4)_3$

A possible reaction pathway could be:

$3LiOH*H_2+V_2O_5+3H_3PO_3→Li_3V_2(PO_4)_3+8H_2O+H_2$

In a 10 l-glass-reactor which is heatable from the outside, 6 l water are placed at 85° C. under streaming $N_2$ (50 NL/h). The streaming $N_2$-cover is maintained during the further process. Under stirring 262.45 g $LiOH*H_2O$ (57.49% LiOH, 6.3 mol Li, Chemetall GmbH, D-60487 Frankfurt, Germany) are added and dissolved to give a clear, colourless solution. 363.76 g $V_2O_5$ (99.97%, 2 Mol $V_2O_5$, GfE Umwelttechnik GmbH, D-90431 Nürnberg, Germany) are added. After dissolution of the $V_2O_5$ a clear, yellow-coloured solution is obtained. 502.04 g $H_3PO_3$ (98%, 6 mol P, Acros Organics, B-2440 Geel, Belgium) are added to this solution during 3 minutes. A dark blue-black coloured aqueous mixture is obtained, having no visible solids. The aqueous mixture obtained is stirred for 16 hours at 90° C. under streaming nitrogen. The solution is subsequently spray-dried under nitrogen in a spray-dryer (type Minor MM, Fa. Niro, Danmark) (temperature at the inlet=330° C., temperature at the outlet=106° C.). A dark-grey spray-powder obtained therefrom shows an amorphous structure in the X-ray powder diffraction pattern (like FIG. 1).

50 g of the obtained spray powder are subsequently added to a continuously rotating (7 rpm) 1 l-crystal ball under streaming nitrogen (15 NL/h) in a laboratory rotary furnace (BASF) and heated in one hour to an end temperature T, is hold at this temperature T for one hour and is subsequently cooled to room temperature under streaming $N_2$.

Example 7.1

The end temperature T of 400° C. gives rise to a powder having a BET-surface of 0.7 m²/g and a X-ray powder diffraction pattern, showing essentially an X-ray amorphous structure (like FIG. 1). The chemical analysis shows the composition $Li_{3.1}V_2(PO_4)_{3.0}$. Scanning electron microscopy shows that the powder has a spherical habitus having a medium spherical size of about 30 μm.

Example 7.2

The end temperature T of 500° C. gives rise to a powder having a BET-surface of 7.7 m²/g and a X-ray powder diffraction pattern, showing essentially the monophasic structure of $Li_3Fe_2(PO_4)_3$ being iso-structural with the product $Li_3V_2(PO_4)_3$. The chemical analysis shows the composition $Li_{3.1}V_2(PO_4)_{3.0}$. Scanning electron microscopy shows that the powder has a spherical habitus having a medium spherical size of about 30 μm.

Example 7.3

The end temperature T of 600° C. gives rise to a powder having a BET-surface of 3.7 m²/g and a X-ray powder diffraction pattern, showing essentially the monophasic structure of $Li_3Fe_2(PO_4)_3$ being iso-structural with the product $Li_3V_2(PO_4)_3$. The chemical analysis shows the composition $Li_{3.1}N_2(PO_4)_{3.0}$. Scanning electron microscopy shows that the powder has a spherical habitus having a medium spherical size of about 30 μm.

Example 7.4

The end temperature T of 700° C. gives rise to a powder having a BET-surface of 1.0 m²/g and a X-ray powder diffraction pattern, showing essentially the monophasic structure of $Li_3Fe_2(PO_4)_3$ being iso-structural with the product $Li_3V_2(PO_4)_3$. The chemical analysis shows the composition $Li_{3.4}N_2(PO_4)_{3.0}$. Scanning electron microscopy shows that the powder has a spherical habitus having a medium spherical size of about 30 μm.

Example 7.5

The end temperature T of 750° C. gives rise to a powder having a BET-surface of 0.4 m²/g and a X-ray powder diffraction pattern, showing essentially the monophasic structure of $Li_3Fe_2(PO_4)_3$ being iso-structural with the product $Li_3V_2(PO_4)_3$. The chemical analysis shows the composition $Li_{3.1}N_2(PO_4)_{3.0}$. Scanning electron microscopy shows that the powder has a spherical habitus having a medium spherical size of about 30 μm.

The invention claimed is:

1. A process for producing a compound according to general formula (I)

(I) $Li_{a-b}M^1{}_bV_{2-c}M^2{}_c(PO_4)_x$ (I)

wherein $M^1$, $M^2$, a, b, c and x have the following meanings:
$M^1$: Na, K, Rb and/or Cs,
$M^2$: Ti, Zr, Nb, Cr, Mn, Fe, Co, Ni, Al, Mg and/or Sc,
a: 1.5-4.5,
b: 0-0.6,
c: 0-1.98 and
x: number to equalize the charge of Li and V, and $M^1$ and/or $M^2$, if present, wherein a-b is >0, wherein the process comprises:
 (A) providing an essentially aqueous mixture comprising at least one lithium-containing compound, at least one vanadium-containing compound in which vanadium has the oxidation state +5 and/or +4, and at least one $M^1$-containing compound, if present, and/or at least one $M^2$-containing compound, if present, and at least one reducing agent which is oxidized to at least one compound comprising at least one phosphorous atom in oxidation state +5,
 (B) drying the mixture provided in (A), in order to obtain a solid compound and
 (C) calcining the solid compound obtained from (B) at a temperature of 300 to 950° C.;
 wherein the compound is in a form consisting essentially of spherical particles or agglomerates having a diameter of from 3 to 200 μm.

2. The process according to claim 1, wherein the essentially aqueous solution which is provided in (A) additionally comprises at least one compound comprising at least one phosphorous atom in oxidation state +5.

3. The process according to claim 1, wherein the at least one compound comprising at least one phosphorous atom in oxidation state +5 which is added in (A) is selected from the group consisting of $H_3PO_4$, $(NH_4)H_2PO_4$, $(NH_4)_2HPO_4$ $(NH_4)_3PO_4$ and mixtures thereof.

4. The process according to claim 1, wherein the at least one reducing agent which is oxidized to at least one compound comprising at least one phosphorous atom in oxidation state +5 is selected from the group consisting of $H_3PO_3$, $(NH_4)H_2PO_3$, $(NH_4)_2HPO_3$, $(NH_4)_3PO_3$, $H_3PO_2$, $(NH_4)H_2PO_2$, $(NH_4)_2HPO_2$, $(NH_4)_3PO_2$ and mixtures thereof.

5. A process for the preparation of a mixture comprising at least one compound according to general formula (I)

(I) $Li_{a-b}M^1{}_bV_{2-c}M^2{}_c(PO_4)_x$ (I)

wherein $M^1$, $M^2$, a, b, c and x have the following meanings:
$M^1$: Na, K, Rb and/or Cs,
$M^2$: Ti, Zr, Nb, Cr, Mn, Fe, Co, Ni, Al, Mg and/or Sc,
a: 1.5-4.5,
b: 0-0.6,
c: 0-1.98 and
x: number to equalize the charge of Li and V, and $M^1$ and/or $M^2$, if present, wherein a-b is >0, wherein the compound is in a form consisting essentially of spherical particles or agglomerates having a diameter of from 3 to 200 μm;
and at least one electrically conducting material; wherein the process comprises:
 (A) providing an essentially aqueous mixture comprising at least one lithium-containing compound, at least one vanadium-containing compound in which vanadium has the oxidation state +5 and/or +4, and at least one $M^1$-containing compound, if present, and/or at least one $M^2$-containing compound, if present, and at least one reducing agent which is oxidized to at least one compound comprising at least one phosphorous atom in oxidation state +5,
 (B) drying the mixture provided in (A), in order to obtain a solid compound and
 (C) calcining the solid compound obtained from (B) at a temperature of 300 to 950° C.

6. The process according to claim 5, wherein the essentially aqueous solution which is provided in (D) additionally comprises at least one compound comprising at least one phosphorous atom in oxidation state +5.

7. The process according to claim 5, wherein the at least one reducing agent which is oxidized to at least one compound comprising at least one phosphorous atom in oxidation state +5 is selected from the group consisting of $H_3PO_3$, $(NH_4)H_2PO_3$, $(NH_4)_2HPO_3$, $(NH_4)_3PO_3$, $H_3PO_2$, $(NH_4)H_2PO_2$, $(NH_4)_2HPO_2$, $(NH_4)_3PO_2$ and mixtures thereof.

8. The process according to claim 5, wherein the electrically conducting material is selected from the group consisting of carbon black, graphite, carbon fibres, carbon nanofibres, carbon nanotubes, electrically conducting polymers and mixtures thereof.

* * * * *